Feb. 6, 1962   F. S. AJERO   3,019,917
MOBILE LOADING RAMPS
Filed June 26, 1957   4 Sheets-Sheet 1
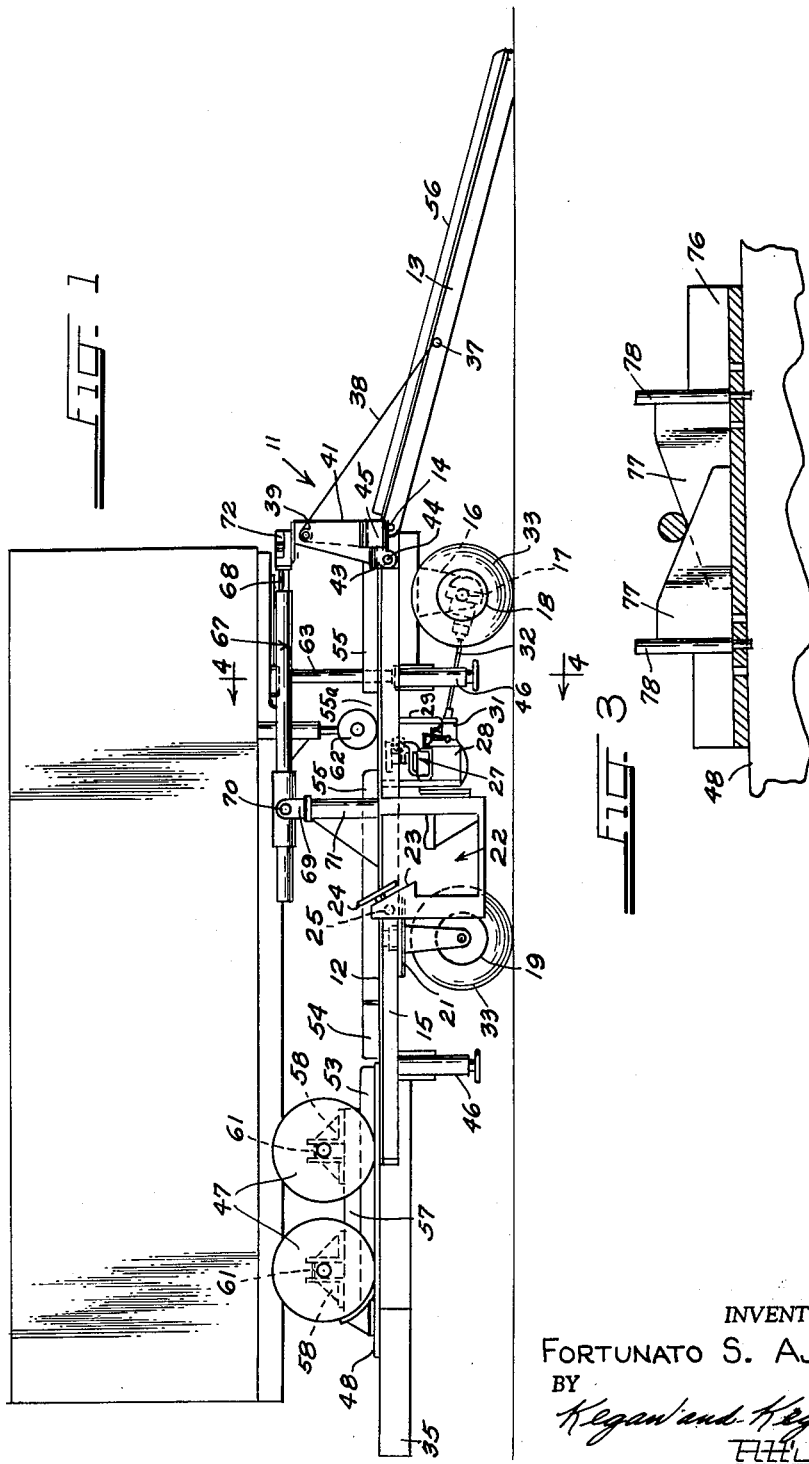
INVENTOR.
FORTUNATO S. AJERO
BY
Kegan and Kegan
ATTYS.

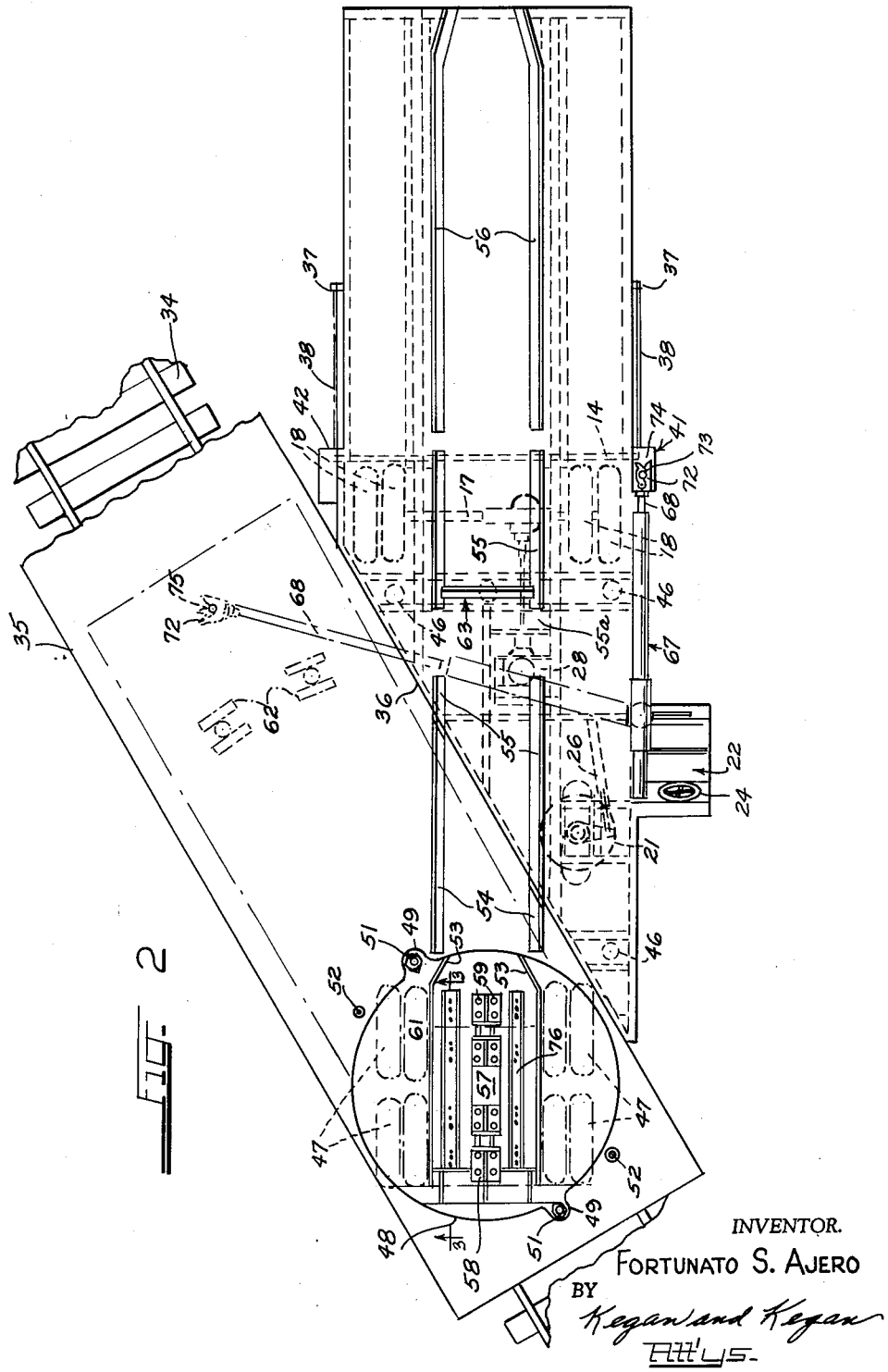

Feb. 6, 1962 F. S. AJERO 3,019,917
MOBILE LOADING RAMPS
Filed June 26, 1957 4 Sheets-Sheet 3
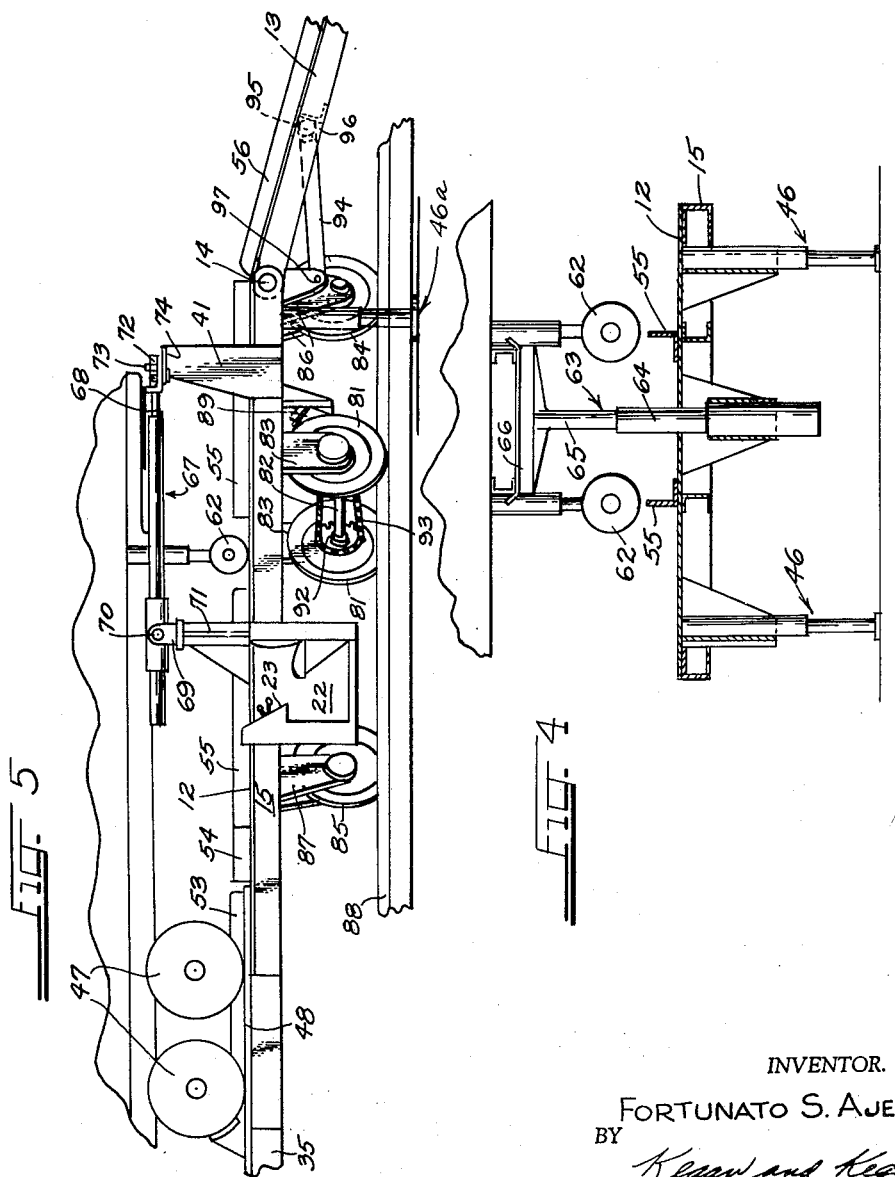
INVENTOR.
FORTUNATO S. AJERO
BY
Kegan and Kegan
ATTYS.

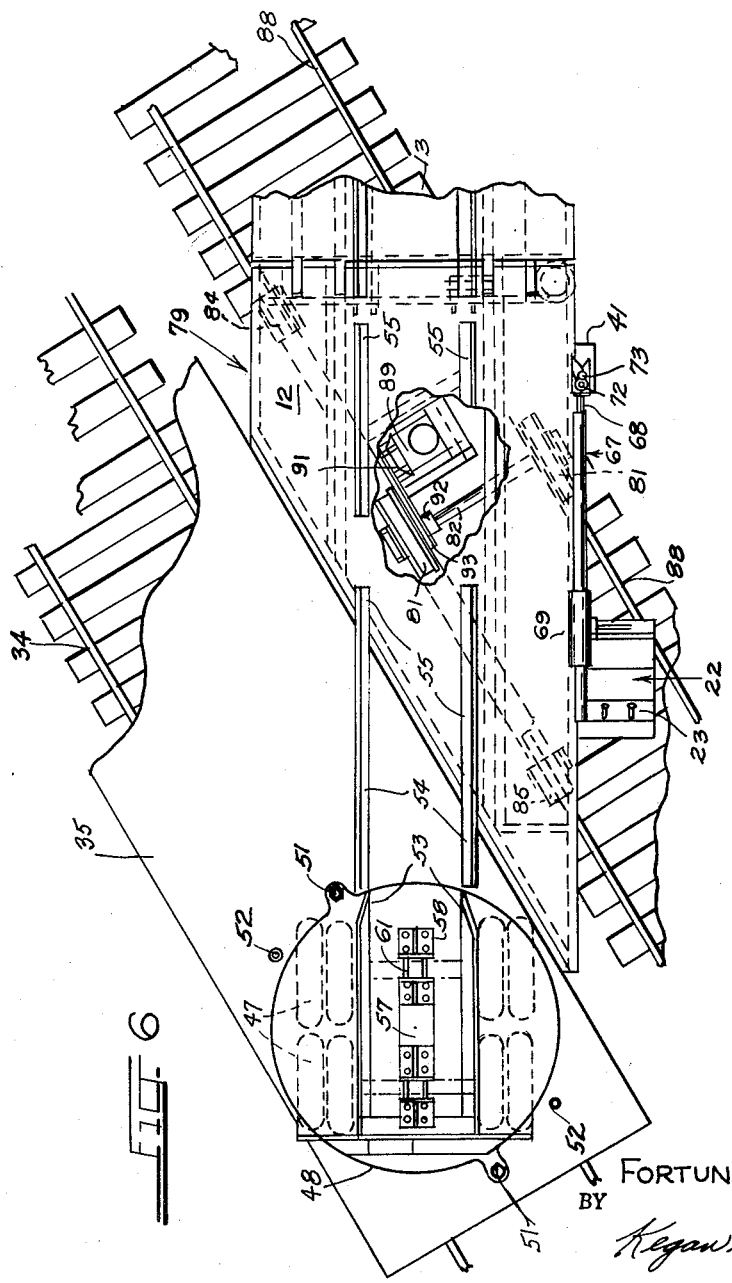

United States Patent Office 3,019,917
Patented Feb. 6, 1962

3,019,917
MOBILE LOADING RAMPS
Fortunato S. Ajero, 547 McDonald Ave., Galion, Ohio, assignor to Albert I. Kegan, as trustee, Evanston, Ill.
Filed June 26, 1957, Ser. No. 668,234
2 Claims. (Cl. 214—38)

The present invention relates to improvements in portable apparatus for side loading and unloading of trailers on railroad flat cars and is particularly concerned with the novel construction and assembly of a mobile ramp.

The invention deals with the problem of overcoming the present day practices commonly employed in loading and unloading trailers on flat cars, which practices are expensive both in time and equipment required. For example, one known system requires the uncoupling and switching of a string of specially designed flat cars onto a siding in line with a stationary loading ramp located at the dead end of the siding. The loading of a number of trailers on a string of flat cars in this manner requires that the trailers be loaded in the required sequence of unloading at different destinations. This is an expensive procedure in labor costs and also in equipment costs because the flat cars in the string cannot be reloaded at points of unloading.

Another known practice is to provide specially constructed trailers of a kind that permit the trailer body to be dismounted from the trailer frame and be transferred to the flat car by a specially designed motorized lift. This method requires the investment in trailer frames and motorized lifts at the loading and destination points and is therefore prohibitively expensive in equipment requirements.

Another system involves the use of specially constructed trailers which have slidable or detachable rear tandem wheel suspension units. When loading, the trailer is backed up to the side of a flat car and the rear end of the trailer is then pushed onto a turn table provided on the flat car. The tandem wheel suspension unit slides along rails on the bottom of the trailer and is then detached, after which the trailer is uncoupled from the tractor and swung into position longitudinally on the flat car. This practice involves the investment in specially constructed trailers and in multiple tandem wheel suspension units at both loading and destination points and is therefore objectionable because of the equipment costs and storage problems involved.

The present apparatus and system overcomes all of the objectionable characteristics of previously known apparatus and equipment. It is such that there is no requirement for heavy investment in special trailer frames or special rear tandem wheel suspension units or power lift forks. Furthermore, there is no need to uncouple and switch a string of flat cars when the apparatus of the present invention is used because said apparatus may be spotted successively alongside flat cars in a string of flat cars for successive loading and/or unloading of trailers. It is therefore, an object of the present invention to overcome the objectionable characteristics of structure and use in prior known apparatus and to provide a novelly constructed and assembled portable apparatus for use while loading and unloading conventionally constructed trailers.

Another object of the invention is to provide a novelly constructed mobile ramp.

Another object is to provide a loading apparatus that is easily, quickly and inexpensively spotted with respect to any flat car in a train of flat cars to be loaded or unloaded.

Another object is to provide a novel apparatus which will facilitate the loading and unloading of trailers of conventional construction onto and off of flat cars quickly and economically.

Another object is to provide a novel ruggedly constructed power operated mobile ramp of a character which may be easily and quickly moved into position alongside a flat car to facilitate loading and unloading of trailers.

With the foregoing and such other objects in view, which will appear as the description proceeds, the invention consists of certain novel features of construction, arrangement and combination of parts hereinafter fully described, illustrated in the accompanying drawings, and particularly pointed out in the appended claims, it being understood that various changes in form, proportion, size and minor details of the structure may be made without departing from the spirit of the invention.

Referring to the drawings in which the same characters of reference are employed to identify corresponding parts:

FIGURE 1 is a side elevational view of a mobile loading ramp embodying features of the present invention and showing it in operative association with a flat car;

FIGURE 2 is a plan view of the loading ramp and flat car shown in FIGURE 1;

FIGURE 3 is a detail sectional view taken on lines 3—3 of FIGURE 2;

FIGURE 4 is a vertical sectional view taken on lines 4—4 of FIGURE 1;

FIGURE 5 is a fragmentary side elevational view similar to FIGURE 1, showing another embodiment of the invention; and FIGURE 6 is a plan view of the structure shown in FIGURE 5.

Referring to the accompanying drawings and particularly to the embodiment illustrated in FIGURES 1–4 inclusive, the mobile ramp, generally indicated at 11, includes a horizontal ramp platforms 12 and an inclined ramp 13 hingedly connected at one end to one end of the platform 12, as by means of a hinge shaft 14. The ramp platform 12 is mounted on a suitable frame structure 15 having depending therefrom, at the end to which the inclined ramp is hingedly connected, suitable journals 16 mounting a transverse drive shaft 17 carrying a plurality of drive wheels 18. A front wheel 19 is mounted adjacent to the other end of the frame structure 12 and near one side thereof in a steerable wheel mount 21. The wheel mountings provide, in effect, a three-point support for the ramp platform.

An operator's compartment 22 is formed integral with the frame structure 15 on one side thereof, which includes a control panel 23 and a steering wheel 24. The steering wheel is operably connected to a hydraulic control valve, generally indicated at 25, that is suitably connected in the hydraulic supply lines connecting a hydraulic steering cylinder 26 with a conventional hydraulic pump generally indicated at 27. The hydraulic pump may be integral with or otherwise operably connected to a suitable motor 28 mounted in a suspension frame 29 on the underside of the ramp platform frame 15.

The motor 28 has connected therewith a transmission 31 of conventional construction, the controls of which are made readily accessible within the operator's compartment, and a propeller shaft 32 connects said transmission with the axle or drive shaft 17 mounting the drive wheels 18. It will thus be observed that the motor 28 functions to operate the hydraulic pump 27 and to drive the wheels 18.

Each of the wheels 18—19 preferably is fitted with pneumatic tires 33. During operation of the motor 28 the mobile ramp 11 may be moved along the right of way adjacent to a railroad track 34 into a loading position with respect to a flat car 35 on said track. As is perhaps best illustrated in FIGURE 2, the mobile ramp is positioned at an acute angle relative to the side edge of a flat car and this is made possible by forming the front end 36 of the platform 12 and its supporting frame 15 on an angle as shown. The platform and its supporting frame are thus substantially triangular-shaped with the front end thereof comprising the hypotenuse of the triangle. During movement of the mobile ramp, the inclined ramp 13 is swung up out of engagement with the ground. This may be effected by providing an anchor pin 37 on each side edge of said inclined ramp to each of which is connected one end of one of a pair of cables 38 that are trained over rollers 39, one carried adjacent to the upper end of each of a pair of standards 41—42 on the frame 15. These cables are secured for winding on a winch 43 carried by a shaft 44 preferably driven by a hydraulic reduction motor 45 mounted on the standard 41.

With the mobile ramp 11 located adjacent to the side of the flat car 35, as shown in FIGURES 1 and 2, the platform 12 may be raised or lowered to bring it to the same level as the floor of the flat car. To this end, the frame 15 carries a plurality of double acting hydraulic jacks 46 (best shown in FIGURE 4). A trailer then is backed up the inclined ramp 13 by its own tractor (not shown) and then across the platform 12 until its rear end supporting wheels 47 are seated on the top surface of a turn-table 48 mounted on the flat car 35.

The turn-table may be of any suitable construction and it includes radial lock tabs or ears 49 each to receive a lock bolt 51 for engagement in a selected tapped anchor hole 52 provideed in the floor of the flat car. The anchor bolts are so located as to permit locking of the turn-table in either one of two positions. The turn-table carries on its top surface, a pair of guides 53 for the wheels 47, which guides are aligned with guide rails 54 on the flat car floor when the turn-table is in the full line position shown in FIGURE 2. The mobile ramp platform 12 and the inclined ramp 13 have similar guide rails 55—56, respectively, which align with each other and with the flat car guide rails 54. The guide rails 55 on the platform 12 have laterally aligned gaps 55a therein for a purpose to be explained presently.

When the trailer is properly positioned with its rear end tandem supporting wheels on the turn-table, said supporting wheels are firmly anchored to the turn-table to prevent trailer displacement. This may be accomplished by providing on the turn-table, trailer axle supports 57 and locking brackets 58. As shown, the supports 57 may each comprise a beam that extends diametrically across and is secured to the turn-table beneath each axle. Each bracket 58 preferably consists of a pair of opposed right-angle members seated upon and secured to the beam, as by bolts 59, one on each side of an axle. A tie-bolt 61 bridges each pair of members above the axle and securely locks the axle in place. The tractor is then uncoupled from the trailer and driven off of the inclined ramp 13, and the front end of the trailer then is allowed to rest upon its conventional landing wheels 62 which have been previously rotated in their mounting so as to facilitate lateral movement of the trailer front end portion in a manner to be described presently.

Should the trailer landing wheels 62 have been adjusted so as to support the trailer in a longitudinally inclined position, it is advisable to readjust said landing wheels vertically to raise or lower the front trailer end. This may best be accomplished by means of a hydraulic trailer jack 63 centrally mounted on the ramp platform 12 forwardly of the position occupied by the landing wheels. As best shown in FIGURE 4, the trailer jack 63 includes a vertical cylinder 64 mounted firmly in the frame 15 and an operating piston 65 that extends upwardly through the platform 12 and has a laterally extending header 66 on its upper end. When hydraulic pressure is admitted into the cylinder 64 through conventional hydraulic lines (not shown) connected with the pump 27, the piston 65 is elevated to carry its header into contact with the trailer bottom so as to lift the trailer whereupon the landing wheels 62 may be adjusted up or down as required. The trailer jack is then retracted and the front end of the trailer is permitted to rest upon the landing wheels.

It should be observed at this time that the transversely aligned landing wheels 62 are in registering alignment with the gaps 55a in the guide rails 55. Consequently the front end portion of the trailer may now be moved laterally through an arc centered on the axis of the turn-table, into transit position on the flat car.

Swinging movement of the front end portion of the trailer from its position on the mobile ramp 11 onto the flat car may be accomplished by any suitable means. However, it is preferred that power operated means be embodied in the mobile ramp structure, preferably in the form of a cylinder-piston assembly including a cylinder 67 having a piston-rod 68 projecting from one end thereof. The cylinder preferably is mounted, adjacent its rearmost end, in a cradle or yoke 69 by means of lateral trunion 70. The yoke 69 is mounted for rotation about a vertical axis on the upper end of an upstanding rigid post 71 provided on the upper face of the frame 15 closely adjacent to one side edge of the platform 12. When the cylinder-piston assembly is in the position of non-use as shown in full lines in FIGURE 2, a grapple hook 72 on the end of the piston-rod 68 is engaged around an anchor pin or stud 73 projecting upwardly from the top horizontal flange 74 on the standard 41.

When the tractor is disengaged from the trailer, the usual king-pin 75 on the trailer bottom is exposed and is available for engagement by the grapple hook 72 after said hook has been disconnected from the anchor stud 73 and the cylinder-piston assembly 67—68 is swung horizontally about its pivot post 71. Hydraulic pressure obtained from the pump 27, or from any other suitable source, then is applied to the cylinder-piston assembly so that when the turn-table lock bolts 51 are removed, the front end portion of the trailer may be swung forcibly from its position on the mobile ramp onto the flat car. During this movement of the trailer the remote landing wheel 62 passes through the gap 55a in one of the guide rails 55. The lock bolts securing the turn-table against rotation may then be replaced.

As is well understood, all of the controls for the various hydraulic means, including the hydraulic pump 27, and for the motor 28, are preferably located on the control panel 23 or are otherwise arranged in the compartment 22 for ready access by the operator.

In instances when a trailer is to remain on a flat car for a prolonged period of time it is most advisable to relieve the tires on the rear end supporting wheels from the weight of the load. This may be effected in many ways, however, it is preferred that the turn-table also include novel means to engage beneath the wheel axles, or at least one of them, to lift the same sufficiently to substantially raise the tires off of the turn-table surface. As best shown in FIGURE 3, this means may comprise one or more upwardly opening channels 76 mounted on the turn-table face and of sufficient length to extend beneath each axle. A pair of opposed chocks 77, one placed on each side of an axle, is driven longitudinally one toward the other along said channel and beneath the axle a distance sufficient to engage the related axle and raise it slightly. The chocks then are secured in such driven position by drop pins 78, one engaged in a selected one of plurality of holes 79 in the channel bottom.

In order to unload a trailer from a flat car the loading procedure described hereinabove is reversed.

In the embodiment disclosed in FIGURES 5 and 6 the mobile loading ramp generally indicated at 79 is substantially like the embodiment described hereinabove except that it is provided with flanged wheels for rolling along a railroad track. As shown, the frame 15 is supported on a pair of drive wheels 81 mounted on a drive shaft 82 journaled in bearing journal 83 depending from said frame, and two side wheels 84, 85 journaled in bearing journals 86, 87 respectively. Both side wheels 84, 85 are arranged on the same side of the platform frame so as to provide, in effect, a three-point suspension. The mobile ramp 79 operates on a railroad track 88 which is adjacent to and parallel with the track 34 upon which the string of flatcars travel.

The motive power for the mobile ramp 79 is provided in the form of a motor 89 operably connected to the drive shaft 82 through sprockets 91, 92 and drive chain 93. In the track mounted embodiment herein disclosed, there is no requirement for hydraulic leveling jacks 46 disclosed in the other embodiment because the ramp platform 12 is always at the level of the flat car being loaded. However, for maximum stability, a stabilizer jack 46a may be provided as shown in FIGURES 5 and 6. Said jack may be used to provide additional support for the platform 12 during loading and unloading operations. Although it is not shown in FIGURES 5 and 6, the trailer leveling jack 63 shown in the previously described embodiment may or may not be incorporated in this structure.

Another structural variation in this embodiment resides in the inclusion of hydraulic cylinders 94 for raising and lowering the inclined ramp 13. One end of each cylinder is pivotally attached, as at 95, to a bracket 96 on the underside of the platform frame 15 and other end or piston rod thereof is pivotally connected, as at 97, to the inclined ramp.

As many possible embodiments may be made in the invention, and as many changes might be made in the embodiments above set forth, it is to be understood that all matters hereinbefore set forth or shown in the accompanying drawings are to be interpreted as illustrative and not in a limiting sense.

Having thus described the invention, what is claimed as new and desired to be secured by Letters Patent is:

1. Apparatus for transferring a highway trailer between a fully loaded position on a railway flatcar located on a section of railway track and a fully unloaded position on a section of roadway paralleling the section of railway track, said apparatus consisting of a load-unload vehicle having a surmounting platform which has a front side disposed at an acute angle to the longitudinal axis of the load-unload vehicle and has a rear side disposed at right angles to the said axis, self-powered means for moving the load-unload vehicle along the section of railway track, between it and the roadway section, to bring said angular front side against the flatcar into abutting side-by-side relation with the side of the flatcar, power jack means for raising and lowering the platform to conform to the level of the flatcar it abuts and for maintaining it level therewith, a ramp and means hingedly connecting it to the platform about an axis which extends across the said rear side of the platform at an acute angle to said abutting sides of the platform and flatcar, power means for moving said ramp between an elevated position thereof and a depressed position thereof wherein it contacts the said roadway and wherein said abutting platform then provides a diagonal roadway continuation over the depressed ramp, over the platform and onto the flatcar, said roadway continuation permitting a said trailer to be moved by a highway tractor between said fully unloaded position of the trailer and a partly loaded position thereof in which the trailer is diagonally related to the flatcar with the rear portion of the trailer resting on the flatcar and the front portion of the trailer extending diagonally forward to overhang the platform, power means carried on the platform for moving the trailer front portion generally sideways of the flatcar between its said partly loaded position and said fully loaded position thereof wherein the trailer is fully loaded on the flatcar in general alignment therewith, said platform and the flatcar it abuts cooperating to provide a continuous support pathway along which the trailer front portion travels while being moved by said power means between the last said trailer positions, said power means comprising means for detachably engaging the front portion of a trailer when the latter is in either its partly loaded or its fully loaded position, an arm connected to said engaging means, and hydraulically powered means for moving said arm between extended and retracted positions thereof, said engaged trailer front portion being brought into the said partly loaded position responsive to the arm being moved into its said retracted position and being brought into its fully loaded position responsive to the arm being moved into its said extended position.

2. Apparatus for transferring a highway trailer between a fully loaded position on a railway flatcar located on a section of railway track and a fully unloaded position on a section of roadway paralleling the section of railway track, said apparatus consisting of a load-unload vehicle having a surmounting platform which has a front side disposed at an acute angle to the longitudinal axis of the load-unload vehicle and has a rear side disposed at right angles to the said axis, self-powered means for moving the load-unload vehicle along the section of railway track, between it and the roadway section, to bring said angular front side against the flatcar into abutting side-by-side relation with the side of the flatcar, power jack means for raising and lowering the platform to conform to the level of the flatcar it abuts and for maintaining it level therewith, a ramp and means hingedly connecting it to the platform about an axis which extends across the said rear side of the platform at an acute angle to said abutting sides of the platform and flatcar, power means for moving said ramp between an elevated position thereof and a depressed position thereof wherein it contacts the said roadway and wherein said abutting platform then provides a diagonal roadway continuation over the depressed ramp, over the platform, and onto the flatcar, said roadway continuation permitting a said trailer to be moved by a highway tractor between said fully unloaded position of the trailer and a partly loaded position thereof in which the trailer is diagonally related to the flatcar with the rear portion of the trailer resting on the flatcar and the front portion of the trailer extending diagonally forward to overhang the platform, power means carried on the platform for moving the trailer front portion generally sideways of the flatcar between its said partly loaded position and said fully loaded position thereof wherein the trailer is fully loaded on the flatcar in general alignment therewith, said platform and the flatcar it abuts cooperating to provide a continuous support pathway along which the trailer front portion travels while being moved by said power means between the last said trailer positions.

References Cited in the file of this patent

UNITED STATES PATENTS

| 1,433,884 | Frost | Oct. 31, 1922 |
| 1,529,223 | Stoll | Mar. 10, 1925 |
| 1,913,792 | Christiansen | June 13, 1933 |
| 2,099,288 | Allen | Nov. 16, 1937 |
| 2,429,010 | Woolslayer et al. | Oct. 14, 1947 |
| 2,449,829 | Agren | Sept. 21, 1948 |
| 2,623,476 | Corrigan et al. | Dec. 30, 1952 |
| 2,644,971 | Rowe | July 14, 1953 |
| 2,760,755 | Yeomans | Aug. 28, 1956 |
| 2,786,590 | Edwards et al. | Mar. 26, 1957 |
| 2,819,687 | Gutridge | Jan. 14, 1958 |
| 2,835,209 | Kavanaugh | May 20, 1958 |
| 2,883,945 | Walker | Apr. 28, 1959 |
| 2,903,977 | Ulinski | Sept. 15, 1959 |

FOREIGN PATENTS

| 459,267 | Great Britain | Jan. 5, 1937 |